US011447231B2

(12) United States Patent
Dege et al.

(10) Patent No.: US 11,447,231 B2
(45) Date of Patent: Sep. 20, 2022

(54) ACTUATING SYSTEM FOR ACTUATING A FOLDABLE WING TIP PORTION OF A WING FOR AN AIRCRAFT

(71) Applicants: Airbus Operations GmbH, Hamburg (DE); Airbus Operations S.A.S., Toulouse (FR)

(72) Inventors: Saskia Dege, Hamburg (DE); Svenja Jegminat, Hamburg (DE); Yann Nicolas, Toulouse (FR)

(73) Assignees: Airbus Operations GmbH, Hamburg (DE); Airbus Operations S.A.S., Toulouse (FR)

( * ) Notice: Subject to any disclaimer, the term of this patent is extended or adjusted under 35 U.S.C. 154(b) by 608 days.

(21) Appl. No.: 16/193,524

(22) Filed: Nov. 16, 2018

(65) Prior Publication Data
US 2019/0152580 A1    May 23, 2019

(30) Foreign Application Priority Data
Nov. 17, 2017    (DE) .................... 10 2017 127 196.1

(51) Int. Cl.
*B64C 3/56*    (2006.01)
*B64C 3/54*    (2006.01)
*F15B 21/0427*    (2019.01)
*H05B 3/26*    (2006.01)

(52) U.S. Cl.
CPC .............. *B64C 3/56* (2013.01); *B64C 3/546* (2013.01); *F15B 21/0427* (2019.01); *H05B 3/26* (2013.01)

(58) Field of Classification Search
CPC ................................. B64C 3/56; B64C 3/546
See application file for complete search history.

(56) References Cited

U.S. PATENT DOCUMENTS

| 5,201,479 | A | * | 4/1993 | Renzelmann | ............. B64C 3/56 244/49 |
| 5,379,969 | A | * | 1/1995 | Marx | ........................ B64C 3/56 244/49 |
| 5,381,986 | A | * | 1/1995 | Smith | ....................... B64C 3/56 244/49 |
| 5,427,329 | A | * | 6/1995 | Renzelmann | ............. B64C 3/56 244/49 |

(Continued)

FOREIGN PATENT DOCUMENTS

| AU | 2013200686 | 2/2013 |
| CN | 103195652 | 7/2013 |

OTHER PUBLICATIONS

Search Report for German Patent Application No. 10 2017 127 196.1 dated Aug. 30, 2018, 7 pages.

(Continued)

*Primary Examiner* — Jessica B Wong
(74) *Attorney, Agent, or Firm* — Nixon & Vanderhye P.C.

(57) ABSTRACT

An actuating system for pivoting a wing tip section (13) about a fixed wing base section (11), and including a heating arrangement (33) positioned and adapted to be operable to heat at least one portion of an actuating arrangement (23) that pivots the wing tip section such that at least for ambient temperatures below a predetermined temperature the required work to be effected by the actuator (25) when moving the second coupling part (31) between the first position and the second position is lower than without heating the at least one portion.

12 Claims, 4 Drawing Sheets

(56) References Cited

U.S. PATENT DOCUMENTS

| | | |
|---|---|---|
| 9,950,810 B2 | 4/2018 | Thoreen et al. |
| 10,392,101 B2 | 8/2019 | Axford et al. |
| 2008/0308683 A1 | 12/2008 | Sankrithi et al. |
| 2010/0000991 A1 | 1/2010 | Henry et al. |
| 2011/0272036 A1* | 11/2011 | Vanderveen .......... F16K 17/048 137/13 |
| 2013/0341467 A1* | 12/2013 | Sakurai .................... B64C 3/56 244/201 |
| 2015/0014478 A1* | 1/2015 | Lassen ...................... B64C 3/56 244/49 |
| 2016/0207608 A1* | 7/2016 | Good ...................... F15B 13/01 |
| 2016/0251073 A1* | 9/2016 | Good ........................ B64C 3/56 244/49 |
| 2017/0021911 A1* | 1/2017 | Wildschek .............. B64C 13/40 |

OTHER PUBLICATIONS

Chinese Office Action cited in CN 201811357522.1, dated Mar. 10, 2022, 24 pages.

* cited by examiner

ACTUATING SYSTEM FOR ACTUATING A FOLDABLE WING TIP PORTION OF A WING FOR AN AIRCRAFT

RELATED APPLICATION

This application claims priority to German Patent Application No. DE 10 2017 127 196.1 filed Nov. 17, 2017, the entirety of which is incorporated by reference.

BACKGROUND

The present invention relates to an actuating system for a wing arrangement for an aircraft, which wing arrangement includes a wing comprising a base section having a first end portion adapted to be secured to the fuselage of an aircraft and an opposite second end portion, and a tip section having a third end portion and an opposite fourth end portion, wherein the third end portion is pivotably connected to the second end portion such that the tip section is pivotable about a pivot axis between a deployed position and a stowed position in which the spanwise length of the wing is smaller than in the deployed position, wherein the actuating system comprises an actuating arrangement which includes an actuator and is operable to selectively move, by operating the actuator, the tip section between the deployed position and the stowed position.

The aspect ratio is a ratio of span to chord of an aircraft wing. The aspect ratio is a factor influencing the efficiency of the aircraft during flight. Generally, an increase of the aspect ratio is associated with an increased efficiency during steady flight. Therefore, an increase of the wingspan of an aircraft is one factor to take into consideration when seeking to reduce fuel consumption. However, when elongating the wing of an existing family of aircraft, it may become necessary to adapt the aircraft family specific infrastructure, and airport fees may increase.

One possibility to increase the wingspan without having to adapt the aircraft family specific infrastructure and having to deal with increased airport fees, or to reduce airport fees for existing aircraft is to provide for a foldable wing construction which allows to pivotably move an outboard end section of the wing between a deployed position, in which the wing has its normal flight configuration, and a stowed position, in which the wing has a folded configuration and the wingspan is decreased as compared to the deployed position. An actuating system is provided to effect the movement of the tip section. The actuating system adds to the size and weight of the wing, so that it is generally desirable to design the actuating system to be as small and light as possible while at the same time ensuring that movement of the tip section can be safely effected under all operating conditions.

SUMMARY

An inventive actuating system is disclosed for a wing arrangement for an aircraft, which wing arrangement has a foldable wing, which is safe and reliable in operation and is at the same time of a small and light construction.

This wing arrangement comprises a wing having a base section and a tip section. The base section has a first end portion, which is adapted to be secured to the fuselage of an aircraft, and an opposite second end portion. Thus, when the wing is mounted to a fuselage of an aircraft at its first end portion the second end portion of the base section is remote from the fuselage, i.e., a terminal end of the first end portion constitutes the inboard end of the base section and of the entire wing and an opposite terminal end of the second end portion constitutes the outboard end of the base section.

The tip section has a third end portion and an opposite fourth end portion. The third end portion is pivotably connected to the second end portion such that the tip section is pivotable about a pivot axis between a deployed position and a stowed position in which the spanwise length of the wing is smaller than in the deployed position. In other words, when two of the wings are mounted to opposite sides of a fuselage of an aircraft, the length of the shortest straight line between the outermost wingtips of the two wings is larger—and may be maximized—in the deployed position than in the stowed position. In particular, the distance between the first end portion and the fourth end portion may be larger—and may be maximized—in the deployed position than in the stowed position. The deployed position, the stowed position or both may be defined by a respective tip section stop mechanism. Then, a part of the tip section abuts the respective tip section stop mechanism when the tip section reaches the deployed position or the stowed position upon being moved from the stowed position into the deployed position and from the deployed position into the stowed position, respectively, and is movable out of abutment towards the stowed position and the deployed position, respectively.

Thus, when the wing is mounted to a fuselage of an aircraft at its first end portion, and at least in the deployed position of the tip section, the third end portion of the tip section is spaced from the fuselage by the base section and the fourth end portion is the outermost portion of the wing, i.e., a terminal end of the third end portion constitutes the inboard end of the tip section and an opposite terminal end of the fourth end portion constitutes the outboard end of the tip section and of the entire wing.

If the wing includes a wing tip device, the tip section may be the wing tip device or the tip section may include the wing tip device and additionally a further portion of the wing at the inboard side of the wing tip device. In this regard, in the usual manner wing tip devices are understood as devices or wing sections installed at the outermost end of a wing and being adapted to increase the effective aspect ratio of a wing without materially increasing the wingspan and to reduce drag by partially recovering the energy of tip vortices.

The pivot axis may be oriented in a direction extending between a first edge and a second edge of the wing opposite to each other in a chord direction of the wing, and may be in a or the local chord direction or in the line of flight. Thus, when moving the tip section from the deployed position into the stowed position, the tip section is pivoted downwardly or upwardly with respect to the base section. However, it is also possible that the pivot axis is oriented in a direction extending transversely or perpendicularly with respect to a plane defined by a chord direction and the wingspan direction, e.g. in the direction of the yaw axis.

The actuating system may comprise an actuating arrangement, which may be, e.g., an actuating unit. The actuating arrangement comprises an actuator, a first coupling part and a second coupling part. The first coupling part is adapted to be coupled to the base section and the second coupling part is adapted to be coupled to the tip section. The actuator is operable to move the second coupling part with respect to the first coupling part between a first position and a second position, such that when the first coupling part is coupled to the base section and the second coupling part is coupled to the tip section the actuating arrangement is operable to selectively move, by operating the actuator, the tip section between the deployed position and the stowed position. In this regard, in the first position of the second coupling part the tip section is in the deployed position, and in the second position of the second coupling part the tip section is in the stowed position.

The actuating system may also comprise a heating arrangement, or heating system. The heating arrangement is positioned and adapted to be operable to heat one or more portions of the actuating arrangement such that—at least for ambient temperatures below a predetermined temperature— the required work to be effected by the actuator when moving the second coupling part between the first position and the second position is lower than without heating the at least one portion. In other words, the one or more portions, which can be heated by the heating arrangement, are chosen such that—as compared to the situation in which no heating is applied—heating one, several or all of them decreases the force or moment to be exerted by the actuator when effecting the movement between the first and second positions, and thereby the work carried out by the actuator when effecting this movement. The predetermined temperature may be, e.g., 0° C., and the heating arrangement may be adapted to heat the respective portion or portions to, e.g., above 0° C. and may be to about room temperature.

It has been found that various portions of actuating systems, such as, for example, transmissions and in particular gearboxes, but also actuators themselves are subject to a substantial increase of forces and/or moments counteracting the actuating forces or moments of the actuator, thereby increasing the reaction load acting on the actuator during the movement of a tip portion between the deployed and stowed positions. For example, such drag moments or torques increase nearly exponentially with decreasing temperature for gearboxes and similar equipment, but are close to zero at very high temperatures, and they may be caused by, e.g., drag or mechanical losses of gears and seals. Generally, the actuator—and possibly also other elements or portions of the actuating system—need to be dimensioned such that the actuating system is capable to reliably move the tip portion under all environmental conditions which, for an aircraft, involve temperatures at least in a range of, e.g., from −55° C. to +70° C. Consequently, in the above-described actuating system, which allows for heating of selected portions of the actuating arrangement, the dimensions of the actuator— and possibly also of other elements or portions of the actuating system—can be reduced as compared to a similar actuating system not including a heating arrangement. Thus, the above-described actuating system is of a simple construction and nevertheless enables significant savings in weight and space requirements, thereby allowing to reduce the weight and dimensions of a wing arrangement in which the actuating system is installed or is to be installed. In addition, or alternatively, the performance of the actuator may be increased.

The actuating arrangement may comprise a transmission having an input and an output. The input of the transmission is (directly or indirectly via additional components) coupled to and driven by the actuator, and the output of the transmission is (directly or indirectly via additional components) coupled to and drives the first coupling part and/or the second coupling part, i.e. the movement of the second coupling part between the first and second positions. The transmission or a part of the transmission may be one of the one or more portions, so that by heating thereof it is possible to reduce a reaction load caused by the transmission for low ambient temperatures, and thereby the amount of work to be done by the actuator when transferring actuating forces or moments via the transmission. The transmission may be or comprise a gearbox, in particular a gearbox including at least one gear stage. The transmission or gearbox may be a transmission of gearbox comprising a through-shaft, and if a part of the transmission or gearbox is one of the one or more portions, the part may then be, e.g., the through-shaft or a part of the through-shaft.

The actuator or a part of the actuator may be one of the one or more portions, so that by heating thereof it is possible to reduce a reaction load caused by internal elements of the actuator for low ambient temperatures, and thereby the amount of work to be done by the actuator when transferring applying actuating forces or moments.

The one or more portions may be a single portion which is constituted by the entire actuating arrangement.

At least one of the one or more portions may comprise a housing in which the respective portion is disposed. For example, such a housing may be the housing of a transmission, such as a gearbox, or of the actuator, such as an electric motor, but may also be the housing of the entire actuating arrangement or of the entire actuating system, if the entire actuating arrangement or the entire actuating system is included in a single housing. In any case, the heating arrangement is then operable to heat the respective one of the one or more portions by heating the housing thereof.

The actuator may be a hydraulic actuator, such as a linear or a rotational hydraulic actuator or motor, or an electric motor.

The heating arrangement may comprise one or more heating elements, each of which is in thermal contact with an associated one of the one or more portions. The one or more heating elements may comprise electric heating elements, such as, e.g., electric heating mats. For example a heating mat could cover parts of the actuator or the entire actuator, parts of a transmission included in the actuating arrangement or the entire transmission, or the entire actuating arrangement. Then the heating mat would be applied externally to the respective component or element. Generally, in the above embodiment, in which at least one of the one or more portions comprises a housing, one or more of the heating elements may be applied externally to the housing or may be integrated into the housing. It is also possible that one or more of the heating elements, such as electrical resistors or conduits connected to a source of heated fluid and adapted to conduct the heated fluid, are immerged into oil present inside or around one or more of the portions, such as, e.g., oil inside or around a transmission or gearbox. The heated fluid may be, e.g., hydraulic fluid, which has an elevated temperature during operation of an aircraft in which the actuating system is installed. For example, the conduit could branch off an existing hydraulic line, so that the conduit in effect provides a permanent hydraulic leakage, which may be, e.g., 1 l/min. Such conduit may or may not be associated with a controller or active device for controlling or adjusting the flow rate of the heated fluid.

The heating arrangement may comprise one or more bleed air outlets, which are adapted to be coupled to a source of bleed air, in particular the normal bleed air system of an aircraft in which the actuating system is installed or is to be installed. Each of the bleed air outlets is positioned such that in operation bleed air from the source of bleed air flowing out of the respective bleed air outlet comes in thermal contact with an associated one of the one or more portions. In other words, the bleed air exiting the bleed air outlet flows onto or around the respective portion.

Where there are one or more bleed air outlets, at least one of the one or more portions may be partially or completely surrounded by a sleeve, such that there is a space between an inner surface of the sleeve and the respective one of the one or more portions, in particular at least a part of an exterior surface of the portion. The sleeve may be thermally insulating. At least one of the bleed air outlets is in communication with the space such that in operation bleed air from the source of bleed air flowing out of the respective bleed air outlet flows into the space, comes into thermal contact with the respective one of the at least one portion—such as with at least a part of an exterior surface thereof—and subsequently flows out of an outlet of the space. Alternatively or additionally bleed air channels may be integrated into the respective one of the one or more portions, and the channels are in communication with at least one of the bleed air outlets such that in operation bleed air flows out them into the channels. Further, alternatively or additionally, it is also possible that at least one of the bleed air outlets is arranged such that in operation bleed air flows out of it freely onto or around the at least one portion, i.e. without being channeled by a sleeve or channel.

The actuating system may further comprise a control unit and one or more temperature sensors. Each of the temperature sensors is associated with one of the one or more portions and is configured to provide a sensor signal indicative of the temperature of the respective portion. For example, the temperature sensor may be arranged in thermal contact with the respective portion. The control unit is connected to the one or more temperature sensors and to the heating arrangement and is adapted to determine, based on the sensor signals received from the temperature sensors, whether the temperature of one or more of the portions is below a predetermined trigger temperature. The control unit is also adapted to automatically control the heating arrangement to heat the respective one or more portions, i.e. the portions among the one or more portions which are provided with a temperature sensor and for which the control unit has determined that their temperature is below the trigger temperature. In this manner it is not necessary to permanently heat the respective portions at relatively high ambient temperatures, thereby allowing to save energy. Alternatively or additionally, the sensors may also be used to avoid overheating and to automatically control the heating arrangement to terminate or reduce heating when an overheating condition is detected or when it is detected that there is a risk of overheating. In that case, the control unit may be adapted to determine, based on the sensor signals received from the temperature sensors, whether the temperature of one or more of the portions is above a second predetermined trigger temperature. The control unit is also adapted to automatically control the heating arrangement to terminate or reduce heating of the respective one or more portions, i.e. the portions among the one or more portions which are provided with a temperature sensor and for which the control unit has determined that their temperature is above the second trigger temperature.

One or more of the actuating systems may be part of a wing arrangement for an aircraft. The wing arrangement is of the construction already described in detail above. Thus, to summarize briefly, it comprises a wing comprising a base section having a first end portion adapted to be secured to the fuselage of an aircraft and an opposite second end portion, and a tip section having a third end portion and an opposite fourth end portion, wherein the third end portion is pivotably connected to the second end portion such that the tip section is pivotable about a pivot axis between a deployed position and a stowed position in which the distance between the first end portion and the fourth end portion is smaller than in the deployed position. For further details, reference is made to the above extensive explanations.

As likewise already described in detail above, for each of the one or more actuating systems, the first coupling part is coupled to the base section and the second coupling part is coupled to the tip section such that the actuating arrangement is operable to selectively move, by operating the actuator, the tip section between the deployed position and the stowed position. In the first position of the second coupling part the tip section is in the deployed position, and in the second position of the second coupling part the tip section is in the stowed position.

The wing arrangement according to any of the above-described embodiments may be part of an aircraft. The aircraft further comprises a fuselage, wherein the first end portion of the base section is attached to the fuselage and the base section is arranged between the fuselage and the tip section.

DRAWINGS

In the following exemplary embodiments of the present invention will be explained in detail with reference to the drawings.

DETAILED DESCRIPTION

Figures 1A, 1B:
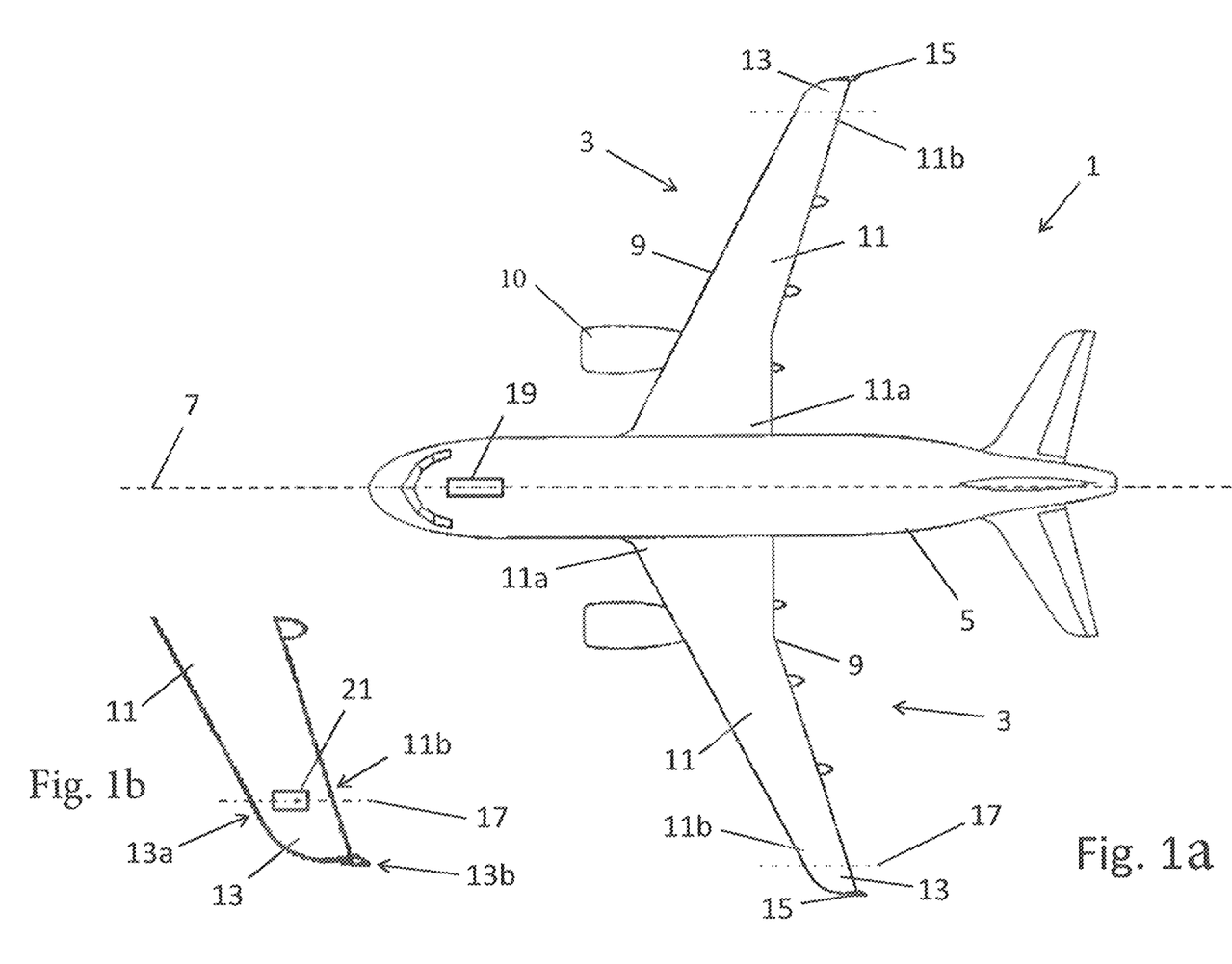
FIGS. 1a and 1b show a schematic top view of an aircraft for use in which the embodiments of the actuating system according to the present invention are adapted.

FIGS. 1a and 1b show a schematic top view of an aircraft 1 which comprises two wing arrangements 3. The aircraft 1 also comprises a fuselage 5 extending along a longitudinal axis 7 which corresponds to the x-axis of the aircraft 1. Each of the wing arrangements 3 comprises a wing 9 that extends away from the fuselage 5, and each wing 9 comprises a base section 11 and a tip section 13. The base section 11, e.g., a fixed wing, has a first or inboard end portion 11a, which is configured or adapted to be coupled to the fuselage 5 and is shown to be coupled to the fuselage 5, and an opposite second or outboard end portion 11b spaced from the fuselage 5 by the remainder of the base section 11.

The tip section 13 of the wing 9 is pivotably connected to the second end portion 11b of the base section 11. More particularly, the tip section 13 extends away from the second or outboard end portion 11b of the base section 11 and comprises a third or inboard end portion 13a and an opposite fourth or outboard end portion 13b spaced from the base section 11 by the remainder of the tip section 13 (as can be seen in the insert of FIG. 1, which shows an outboard end region of one of the wings 9 in enlarged form). The fourth end portion may be provided by a part of a wing tip device 15, which itself is a part of the tip section 13. The third end portion 13a is pivotably mounted on or coupled to the second end portion 11b of the base section 11 in such a manner that the tip section 13 is able to pivot between a deployed position and a stowed position about a pivot axis 17.

The pivot axis 17 generally extends in a direction between a leading edge and a trailing edge of the respective wing 9 and, in the example shown, parallel or essentially parallel to the longitudinal axis 7, i.e., in the flight direction. In the deployed position illustrated in FIG. 1 the tip section 13 extends essentially along the longitudinal axis of the base section 11, and in the stowed position the tip section 13 is angled upwardly with respect to the longitudinal axis of the base section 11, so that the spanwise length of the wing 9 is decreased. Thus, in the deployed position the fourth end portions or the outermost outboard ends of the tip sections 13 of the wings 9 have a larger distance than in the stowed position, so that the wingspan of the aircraft 1 can be selectively decreased by moving the tip sections 13 of the wings 9 from the deployed position into the stowed position in order to allow for the use of infrastructure adapted to aircraft of such reduced wingspan and in order to save on airport fees, and increased in order to allow for reduced fuel consumption during flight.

In order to effect the pivotal movement of the tip section 13 between the deployed and the stowed positions, each of the wing arrangements 3 comprises an actuating system 21. The actuating system 21 is shown only very schematically in the insert of FIG. 1, and two particular embodiments of the actuating system 21 are schematically illustrated in some more detail in FIGS. 2 and 3. The aircraft 1 also comprises a control unit 19, which may be part of the central control system of the aircraft 1. The control unit 19 is adapted to control at least part of the operation of the actuating system 21.

Figure 2A:
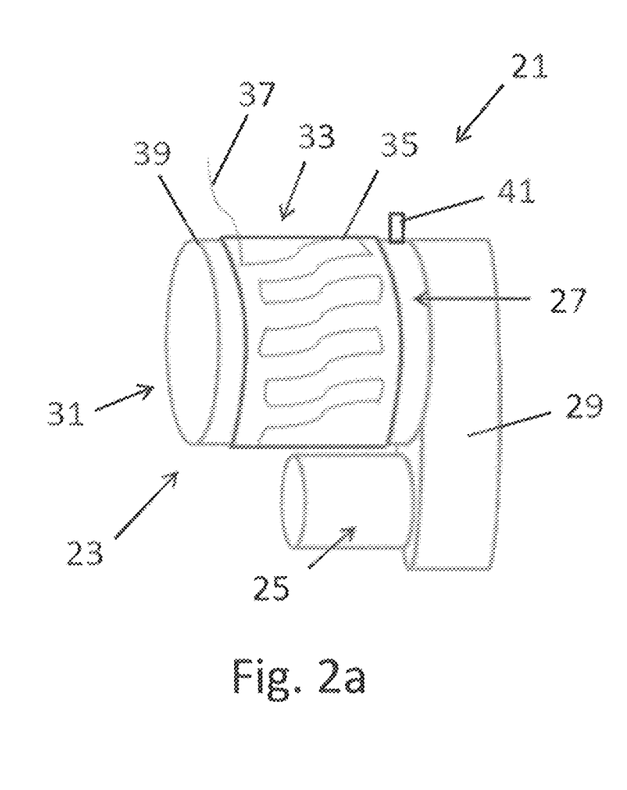
FIG. 2a shows a schematic perspective view of a first embodiment of an actuating system according to the present invention.
Figure 2B:
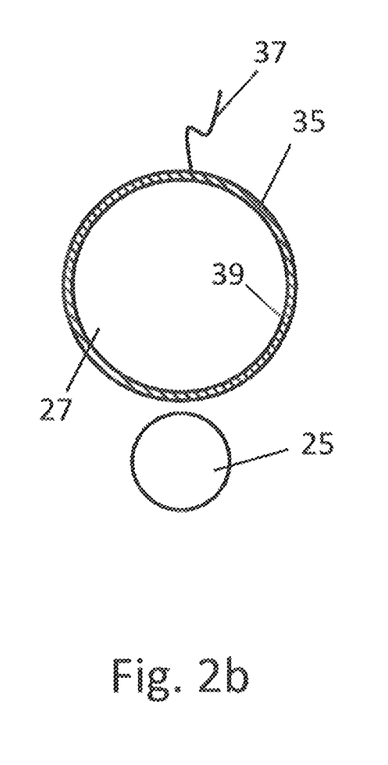
FIG. 2b shows a schematic cross-sectional view of the first embodiment of an actuating system according to the present invention.

The actuating system 21 illustrated in FIGS. 2a and 2b comprises an actuating arrangement 23 which, in turn, comprises an actuator 25 in the form of an electric or rotational hydraulic motor, and an actuating unit 27, which is or includes a gearbox and is driven by the motor 25. The actuating arrangement 23 further comprises a first coupling part 29, inside of which transmission or coupling elements for drivingly coupling the actuator 25 to the actuating unit 27, and a second coupling part 31. In the illustrated embodiment, the first coupling part 29 is fixedly connected to the base section 11, and the second coupling part 31 drivingly engages the tip section 13, i.e. is drivingly coupled to the tip section 13, in a manner not illustrated in detail in the Figures. For example, the second coupling part 31 may be a gear of the actuating unit 27. Alternatively, the second coupling part 31 may for example be a toothed element fixedly secured to the tip section 13 and engaged by a gear of the actuating unit. Generally, different arrangements and configurations of the first and second coupling parts 29, 31 are possible. In any case, by operation of the motor 25 the tip section 13 is selectively moved between the deployed position and the stowed position by effecting a corresponding relative movement between the first and second coupling parts 29, 31.

The actuating system 21 further comprises a heating arrangement 33, which comprises an electric heating element in the form of a heating mat 35 which is connected to a source of electrical energy (not shown) of the aircraft 1 via an electric line 37. The heating mat 35 circumferentially extends around a substantial portion of a generally cylindrical housing 39 of the actuating unit or gearbox 27 and is in thermal contact with an outer surface of the housing 39 (see the cross-sectional view of FIG. 2b). Thus, the heating mat 35 is operable to heat the actuating unit 27, which therefore constitutes a portion of the actuating arrangement 23 which is heatable by the heating arrangement 33. Due to the heating an increase of a reaction load of the actuating unit or gearbox 27 at decreasing temperatures can be counteracted.

Figure 3A:
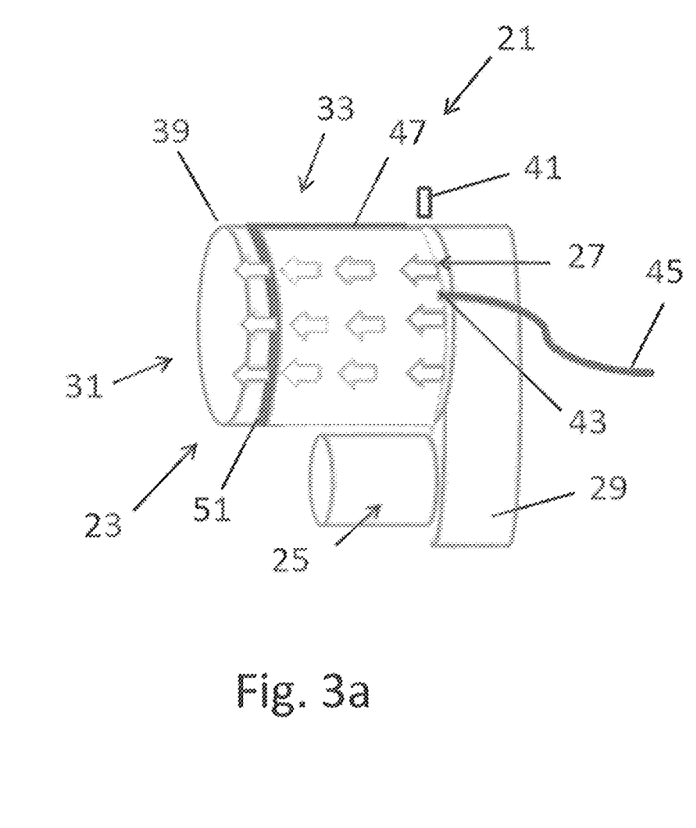
FIG. 3a shows a schematic perspective view of a second embodiment of an actuating system according to the present invention.
Figure 3B:
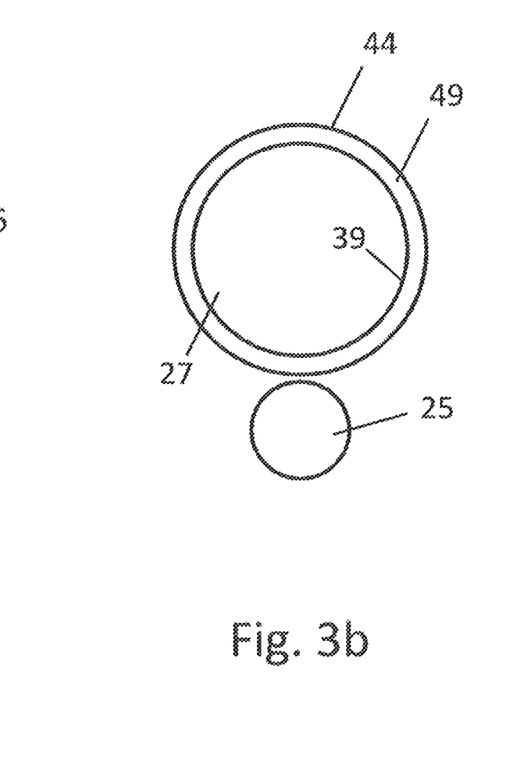
FIG. 3b shows a schematic cross-sectional view of the second embodiment of an actuating system according to the present invention.

In an alternative embodiment illustrated in FIGS. 3a and 3b the actuating system 21 is largely of the same construction as the actuating system 21 of FIGS. 2a and 2b, so that reference is made to the description of the embodiment of FIGS. 2a and 2b. However, instead of a heating mat the heating arrangement 33 comprises a bleed air outlet 43 at the terminal end of a bleed air conduit 45 coupled to a source of bleed air in the aircraft 1, such as an outlet from a compressor section on a gas turbine engine 10 on the aircraft. The thermally insulating sleeve 47 which circumferentially extends around the housing 39 of the actuating unit or gearbox 27. As can be best seen in FIG. 3b, a circumferential space 49 is present between the inner surface of the sleeve 47 and the outer circumferential surface of the housing 39. The bleed air outlet 43 is arranged such that bleed air exiting the bleed air outlet 43 enters the space 49 at one of the axial ends thereof flows through the space 49 in the axial direction of the housing 39 and sleeve 47 in thermal contact with the housing 39, and exits the space 49 at the opposite axial end, which constitutes an outlet 51 for bleed air. This is illustrated by the arrows in FIG. 3a. Thus, the bleed air can be utilized to heat the actuating unit 27, which therefore constitutes a portion of the actuating arrangement 23 which is heated by the heating arrangement 33. Due to the heating an increase of a reaction load of the actuating unit or gearbox 27 at decreasing temperatures can be counteracted.

Figure 4:
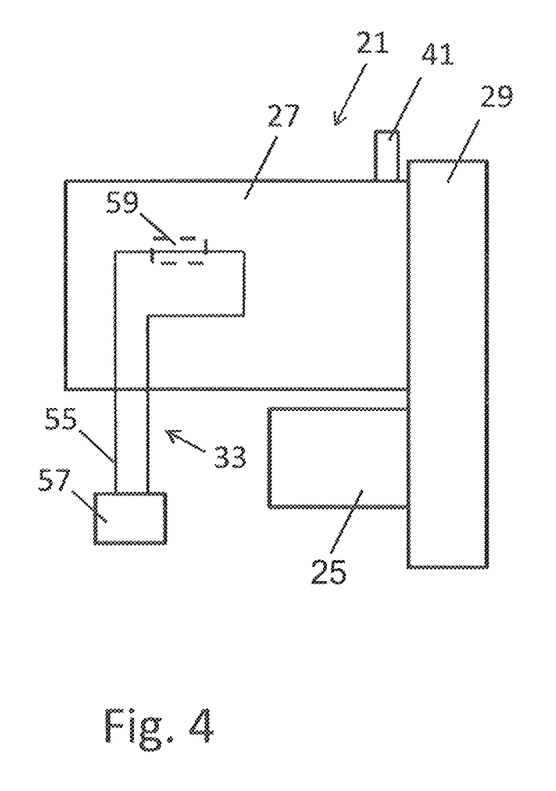
FIG. 4 shows a schematic cross-sectional view of a third embodiment of an actuating system according to the present invention.

FIG. 4 shows the actuating system 21, which has a similar construction to the actuating system 21 of FIGS. 2a and 2b, so that reference is made to the description of the embodiment of FIGS. 2a and 2b. However, instead of a heating mat the heating arrangement 33 comprises a conduit or line 55 for conducting either heated hydraulic fluid through oil (not illustrated) present in the interior of the actuating unit or gearbox 27 or electric current to a resistive heating element 59 in the interior of the actuating unit or gearbox 27. For this purpose, the conduit or line 55 is coupled to a source 57 of the heated hydraulic fluid or electric current, respectively. The source 57 may be, e.g., a hydraulic line of the aircraft 1, for which the conduit 55 in effect constitutes a hydraulic leakage, or a power supply or power supply line of the aircraft 1. In the case of a conduit 55 conducting heated hydraulic fluid the conduit 55 constitutes a part of a heat exchanger adapted to transfer heat from the heated hydraulic fluid to the oil of the actuating unit or gearbox 27.

In all three embodiments illustrated in FIGS. 2a, 2b, 3a, 3b and 4 a temperature sensor 41 is arranged in thermal contact with the housing 39 and is connected to the control unit 19, so that the control unit 19 can determine the temperature of the housing 39. The control unit 19 is configured and adapted such that when the determined temperature falls below a predetermined trigger temperature, which may be, e.g., 0° C., the control unit 19 automatically operates the heating arrangement 33 to heat the housing 39 and, thereby, the actuating unit or gearbox 27.

An actuating system for a wing arrangement 3 for an aircraft 1. The arrangement 3 includes a wing 9 comprising a base section 11 having a first end portion 11a adapted to be secured to the fuselage 5 of an aircraft 1 and an opposite second end portion 11b, and a tip section 13 having a third end portion 13a and an opposite fourth end portion 13b, wherein the third end portion 13a is pivotably connected to the second end portion 11b such that the tip section 13 is pivotable about a pivot axis 17 between a deployed position and a stowed position in which the spanwise length of the wing 9 is smaller than in the deployed position. The actuating system 21 comprises an actuating arrangement 23 which comprises an actuator 25, a first coupling part 29 and a second coupling part 31. The first coupling part 29 is adapted to be coupled to the base section 11, the second coupling part 31 is adapted to be coupled to the tip section 13 and the actuator 25 is operable to move the second coupling part 31 with respect to the first coupling part 29 between a first position and a second position, such that when the first coupling part 29 is coupled to the base section 11 and the second coupling part 31 is coupled to the tip section 13 the actuating arrangement 23 is operable to selectively move, by operating the actuator 25, the tip section 13 between the deployed position and the stowed position. In the first position of the second coupling part 31 the tip section 13 is in the deployed position, and in the second position of the second coupling part 31 the tip section 13 is in the stowed position. The actuating system 21 further comprises a heating arrangement 33 which is positioned and adapted to be operable to heat at least one portion of the actuating arrangement 23 such that at least for ambient temperatures below a predetermined temperature the required work to be effected by the actuator 25 when moving the second coupling part 31 between the first position and the second position is lower than without heating the at least one portion.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An actuating system for a wing arrangement for an aircraft, wherein the wing arrangement includes a wing with a base section having a first end portion configured to be secured to a fuselage of the aircraft and an opposite second end portion, and a tip section including a third end portion and an opposite fourth end portion, wherein the third end portion is pivotably connected to the second end portion such that the tip section is pivotable about a pivot axis between a deployed position and a stowed position in which a spanwise length of the wing is smaller than in the deployed position, wherein the actuating system comprises:
an actuating arrangement including an actuator, a first coupling part and a second coupling part, wherein the first coupling part is configured to be coupled to the base section, the second coupling part is configured to be coupled to the tip section, and the actuator is operable to move the second coupling part with respect to the first coupling part between a first position and a second position such that when the first coupling part is coupled to the base section and the second coupling part is coupled to the tip section the actuating arrangement is operable to selectively move, by operating the actuator, the tip section between the deployed position and the stowed position, wherein in the first position of the second coupling part the tip section is in the deployed position and in the second position of the second coupling part the tip section is in the stowed position, and a heating arrangement is positioned and configured to directly heat at least one of the actuator, the first coupling part and the second coupling part, such that at least for ambient temperatures below a predetermined temperature the required work to be effected by the actuator when moving the second coupling part between the first position and the second position is lower than without directly heating the at least one of the actuator, the first coupling part and the second coupling part, wherein the actuator comprises a transmission and a motor, and the transmission has an input coupled to and driven by the motor, and an output coupled to and driving at least one of the first coupling part and the second coupling part, and wherein the heating arrangement is configured to directly heat the transmission.

2. The actuating system according to claim 1, wherein the transmission includes a gearbox, and the heating arrangement is configured to directly heat the gearbox.

3. An actuating system for a wing arrangement for an aircraft, wherein the wing arrangement includes a wing with a base section having a first end portion configured to be secured to a fuselage of the aircraft and an opposite second end portion, and a tip section including a third end portion and an opposite fourth end portion, wherein the third end portion is pivotably connected to the second end portion such that the tip section is pivotable about a pivot axis between a deployed position and a stowed position in which a spanwise length of the wing is smaller than in the deployed position, wherein the actuating system comprises:
an actuating arrangement including an actuator, a first coupling part and a second coupling part, wherein the first coupling part is configured to be coupled to the base section, the second coupling part is configured to be coupled to the tip section, and the actuator is operable to move the second coupling part with respect to the first coupling part between a first position and a second position such that when the first coupling part is coupled to the base section and the second coupling part is coupled to the tip section the actuating arrangement is operable to selectively move, by operating the actuator, the tip section between the deployed position and the stowed position, wherein in the first position of the second coupling part the tip section is in the deployed position and in the second position of the second coupling part the tip section is in the stowed position, and a heating arrangement is positioned and configured to directly heat at least one of the actuator, the first coupling part and the second coupling part, such that at least for ambient temperatures below a predetermined temperature the required work to be effected by the actuator when moving the second coupling part between the first position and the second position is lower than without directly heating the at least one of the actuator, the first coupling part and the second coupling part, wherein the actuator comprises an electric motor, and the heating arrangement is configured to directly heat the electric motor.

4. The actuating system according to claim 3, wherein the heating arrangement comprises one or more heating elements, each in direct contact with the at least one of the actuator, the first coupling part and the second coupling part.

5. The actuating system according to claim 4, wherein the one or more heating elements comprise electric heating elements, and the electric heating elements are positioned on at least one of the actuator, first coupling part and the second coupling part.

6. The actuating system according to claim 3, wherein the heating arrangement comprises one or more bleed air outlets, which are configured to be coupled to a source of bleed air, and each of which is positioned such that in operation bleed air from the source of bleed air flowing out of the respective bleed air outlet comes in thermal contact with at least one of the actuator, the first coupling part and the second coupling part.

7. The actuating system according to claim 6, wherein the at least one the actuator, first coupling part and the second coupling part is at least partially surrounded by a sleeve such that there is a space between an inner surface of the sleeve and the respective at least one of the actuator, first coupling part and the second coupling, and wherein at least one of the bleed air outlets is in communication with the space such that in operation bleed air from the source of bleed air flowing out of the respective bleed air outlet flows into the space, comes into thermal contact with the respective at least one of the actuator, the first coupling part and the second coupling part, and subsequently flows out of an outlet of the space.

8. The actuating system according to claim 3, further comprising a control unit and at least one temperature sensor, wherein each of the at least one temperature sensor is associated with at least one of the actuator, first coupling part and the second coupling part, and configured to provide a sensor signal indicative of the temperature of the respective portion, and wherein the control unit is connected to the at least one temperature sensor and to the heating arrangement and is configured to determine, based on the sensor signals received from the temperature sensors, whether the temperature of one or more of the actuator, first coupling part and the second coupling part is below a predetermined trigger temperature, and to automatically control the heating arrangement to heat the at least one actuator, first coupling part and the second coupling part in response to a determination that the sensor signals indicate a temperature below the predetermine trigger temperature.

9. The actuating system according to claim 3, wherein the heating arrangement comprises a conduit coupled to a source of a heated fluid and the conduit extends into the actuating arrangement, wherein the heated fluid flows from the source, through the conduit and to the actuator.

10. An actuating system for a wing arrangement for an aircraft, wherein the wing arrangement includes a wing with a base section having a first end portion configured to be secured to a fuselage of the aircraft and an opposite second end portion, and a tip section including a third end portion and an opposite fourth end portion, wherein the third end portion is pivotably connected to the second end portion such that the tip section is pivotable about a pivot axis between a deployed position and a stowed position in which a spanwise length of the wing is smaller than in the deployed position, wherein the actuating system comprises:
an actuating arrangement including an actuator, a first coupling part and a second coupling part, wherein the first coupling part is configured to be coupled to the base section, the second coupling part is configured to be coupled to the tip section, and the actuator is operable to move the second coupling part with respect to the first coupling part between a first position and a second position such that when the first coupling part is coupled to the base section and the second coupling part is coupled to the tip section the actuating arrangement is operable to selectively move, by operating the actuator, the tip section between the deployed position and the stowed position, wherein in the first position of the second coupling part the tip section is in the deployed position and in the second position of the second coupling part the tip section is in the stowed position, and a heating arrangement is positioned and configured to directly heat at least one of the actuator, the first coupling part and the second coupling part, such that at least for ambient temperatures below a predetermined temperature the required work to be effected by the actuator when moving the second coupling part between the first position and the second position is lower than without directly heating the at least one of the actuator, the first coupling part and the second coupling part, wherein the heating arrangement comprises a line connected to a source of electrical energy and to a resistive heating element within the actuating arrangement, wherein the resistive heating element is configured discharge heat when electrical energy is applied from the source and via the line.

11. The actuating system according to claim 3 wherein the heating arrangement is configured to directly heat each of the actuator, the first coupling part and the second coupling part.

12. The actuating system according to claim 3 where in at least one of the actuator, the first coupling part and the second coupling part includes a housing, and the heating arrangement is connected to the housing and configured to directly heat the housing.

* * * * *